United States Patent
Horiuchi et al.

(10) Patent No.: US 10,879,755 B2
(45) Date of Patent: Dec. 29, 2020

(54) MOTOR WITH A HIGH HEAT DISSIPATION EFFECT

(71) Applicant: SANYO DENKI CO., LTD., Tokyo (JP)

(72) Inventors: Manabu Horiuchi, Tokyo (JP); Toshihito Miyashita, Nagano (JP)

(73) Assignee: SANYO DENKI CO., LTD., Tokyo (JP)

(*) Notice: Subject to any disclaimer, the term of this patent is extended or adjusted under 35 U.S.C. 154(b) by 747 days.

(21) Appl. No.: 15/399,260

(22) Filed: Jan. 5, 2017

(65) Prior Publication Data
US 2017/0207676 A1 Jul. 20, 2017

(30) Foreign Application Priority Data
Jan. 15, 2016 (JP) .................. 2016-006424

(51) Int. Cl.
*H02K 5/04* (2006.01)
*H02K 1/18* (2006.01)

(52) U.S. Cl.
CPC .................. *H02K 5/04* (2013.01); *H02K 1/18* (2013.01)

(58) Field of Classification Search
CPC .. H02K 5/04; H02K 1/18; H02K 9/22; H02K 11/0015; H02K 5/161; H02K 5/15; H02K 5/02
See application file for complete search history.

(56) References Cited

U.S. PATENT DOCUMENTS

| | | | |
|---|---|---|---|
| 8,552,604 B2 | 10/2013 | Matsuda et al. | |
| 2007/0210658 A1* | 9/2007 | Terauchi | H02K 5/04 310/68 B |
| 2013/0300222 A1* | 11/2013 | Nakano | H02K 3/50 310/43 |
| 2015/0055759 A1 | 2/2015 | Schmidt et al. | |
| 2015/0155759 A1 | 6/2015 | Matsuo | |
| 2015/0263582 A1* | 9/2015 | Miyashita | H02K 5/161 310/90 |
| 2015/0263587 A1* | 9/2015 | Fedosovsky | H02K 7/06 310/68 B |
| 2016/0013697 A1* | 1/2016 | Haga | H02K 3/28 310/71 |
| 2016/0105066 A1* | 4/2016 | Horng | H02K 5/08 310/89 |

FOREIGN PATENT DOCUMENTS

| JP | 64-20053 | 1/1989 |
|---|---|---|
| JP | 8-111966 | 4/1996 |
| JP | 9-261935 | 10/1997 |
| JP | 5316469 | 7/2013 |
| JP | 2015-106970 | 6/2015 |

OTHER PUBLICATIONS

Japanese Office Action dated May 2, 2016 in Patent Application No. 2016-006424.

* cited by examiner

*Primary Examiner* — Bryan R Perez
(74) *Attorney, Agent, or Firm* — Rankin, Hill & Clark LLP

(57) ABSTRACT

A motor includes: a stator iron core; a frame housing the stator iron core; and a flange including a tubular portion formed in a tubular shape. The frame includes, along an extending direction of a rotation shaft of the motor, a stator housing that houses the stator iron core and a fitted portion that is fitted to the flange. The tubular portion covers at least a half of an area of the stator housing, the area housing the stator iron core.

12 Claims, 7 Drawing Sheets

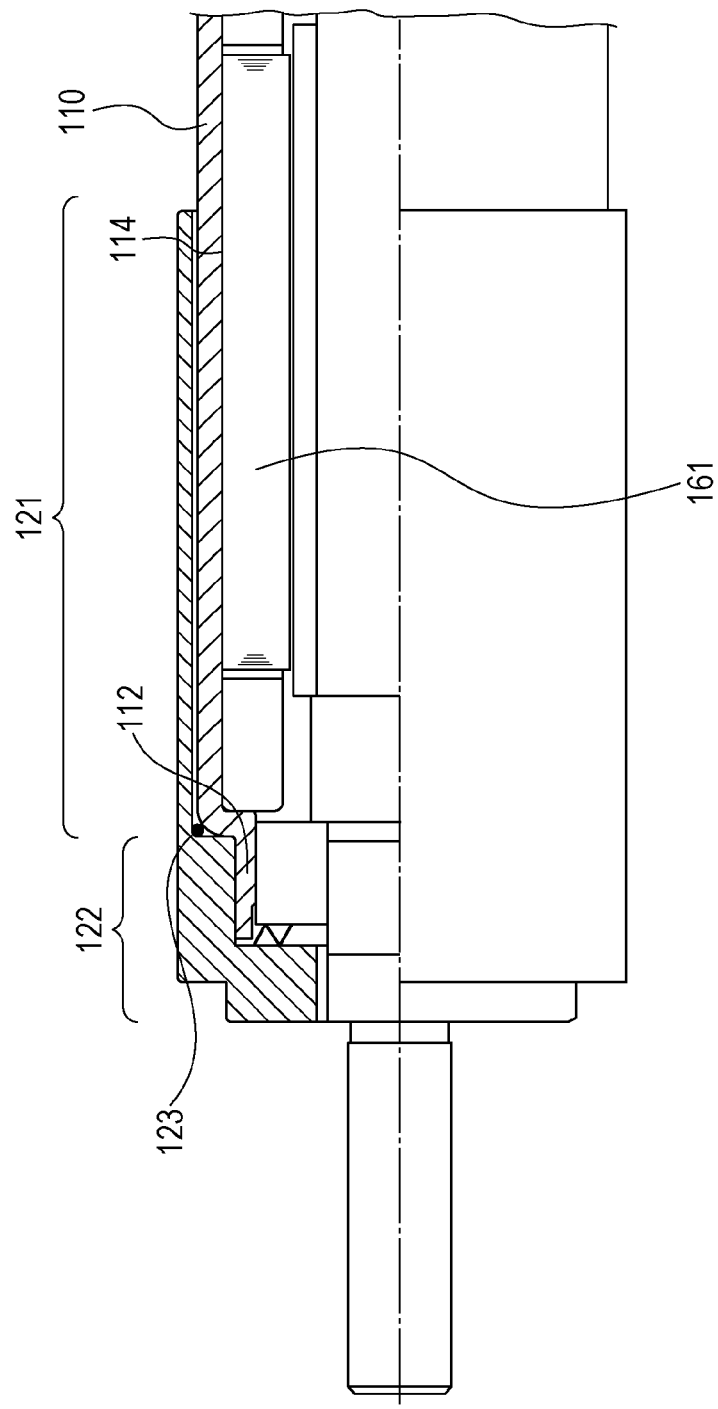

MOTOR WITH A HIGH HEAT DISSIPATION EFFECT

CROSS-REFERENCE TO RELATED APPLICATION

This application claims priority from Japanese Patent Application No. 2016-006424 filed with the Japan Patent Office on Jan. 15, 2016, the entire content of which is hereby incorporated by reference.

BACKGROUND

1. Technical Field

The present disclosure relates to a motor.

2. Description of the Related Art

A relatively small-sized motor generally includes a case (in some cases, referred to as a frame) that houses a stator iron core of the motor and a flange that covers at least one end of the case. The flange disposed on a side where a rotational force of the motor is output in an end portion of the case is referred to as an output side flange in some cases. A member that covers an opposite side of the case is referred to as an opposite output side bracket in some cases.

Japanese Patent No. 5316469 discloses a motor and its peripheral structure of members, such as a flange and a bracket. In the structure shown in FIG. 1 of this document, a frame end (14) (corresponding to the output side flange) of a motor case (11) that houses a stator iron core (15) covers one end of the motor case (11).

SUMMARY

A motor includes: a stator iron core; a frame housing the stator iron core; and a flange including a tubular portion formed in a tubular shape. The frame includes, along an extending direction of a rotation shaft of the motor, a stator housing that houses the stator iron core and a fitted portion that is fitted to the flange. The tubular portion covers at least a half of an area of the stator housing, the area housing the stator iron core.

BRIEF DESCRIPTION OF THE DRAWINGS

FIG. 4 is a cross-sectional side view of the motor;

DESCRIPTION OF THE EMBODIMENTS

Figure 1:
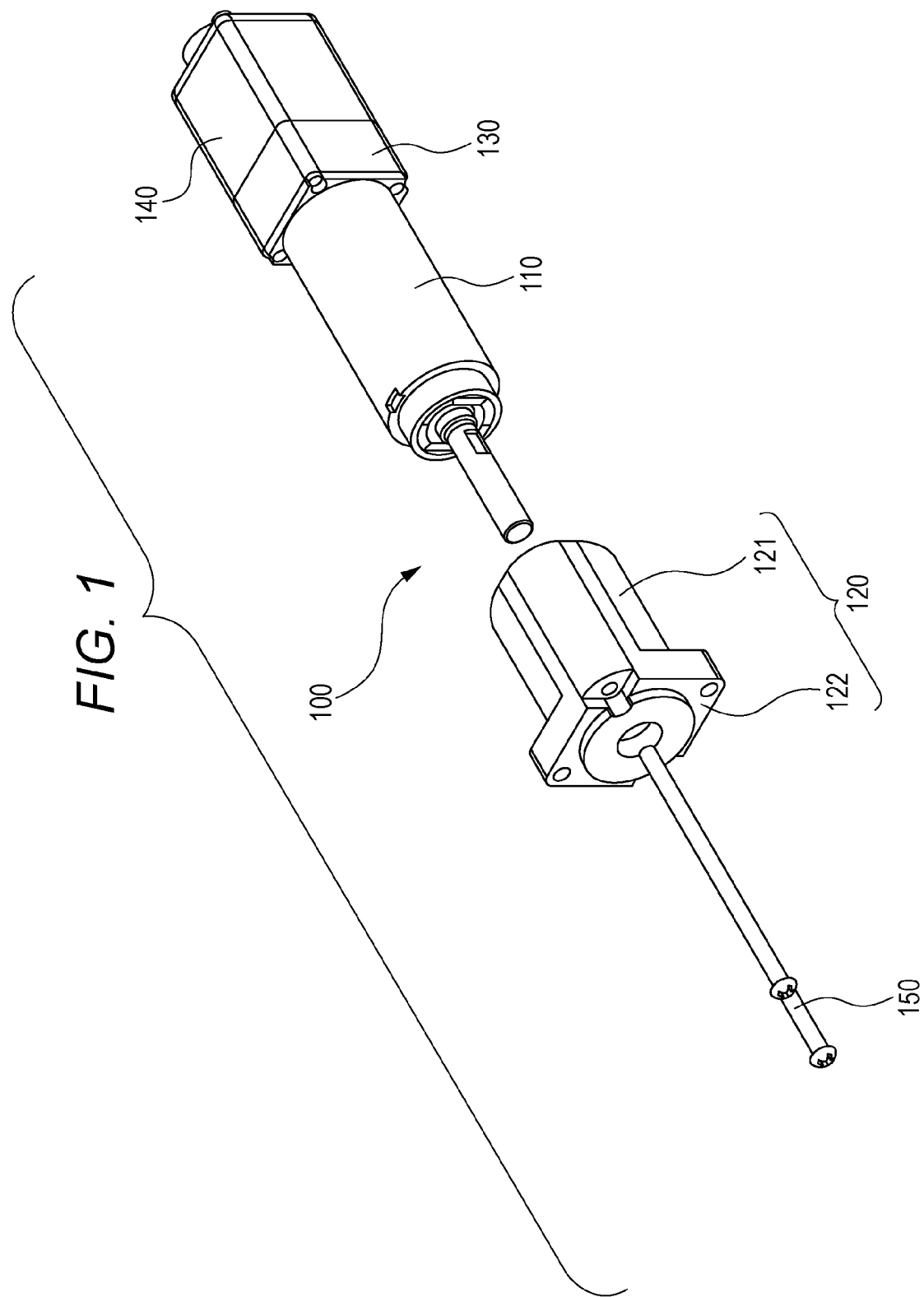
FIG. 1 is a perspective view of a motor according to a first embodiment, and components of the motor are disassembled in this drawing.

In the following detailed description, for purpose of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

A stator iron core of a motor and a coil inside the stator iron core generate heat. Various failures occur if a motor temperature increases by this heat. In view of this, a structure that dissipates the generated heat is desired.

With the above-described motor shown in FIG. 1 of Japanese Patent No. 5316469, the heat generated from the stator iron core (15) is considered to be dissipated via a route from the motor case (11) to the frame end (14) as a heat dissipation route. However, with this configuration, a distance from a heat generation source to the frame end (14) is relatively long. In view of this, it is assumed that temperature saturation in the motor case (11) tends to occur easily. Then, one concern is a possibility of an insufficient heat dissipation performance due to poor heat flow caused by an increased thermal resistance.

One object of the present disclosure is to provide a structure of a motor with a high heat dissipation effect.

In the motor according to one aspect of the present disclosure, a motor frame has a portion that houses a stator iron core. This portion of the motor frame is covered with an output side flange for at least a half or more of this portion in a longitudinal direction.

The motor according to this aspect ensures effectively forming the heat dissipation route and obtaining a sufficient heat dissipation effect.

The motor is configured as follow, for example. The motor includes: a stator iron core; a frame housing the stator iron core; and a flange including a tubular portion formed in a tubular shape. The frame includes, along an extending direction of a rotation shaft of the motor, a stator housing that houses the stator iron core and a fitted portion that is fitted to the flange. The tubular portion covers at least a half of an area of the stator housing, the area housing the stator iron core.

First Embodiment

FIG. 1 is a perspective view illustrating a motor 100 according to a first embodiment of the present disclosure. In FIG. 1, components of the motor 100 are disassembled. The motor 100 includes a frame 110, an output side flange 120, an opposite output side bracket 130, a rotation detector 140, and a mounting screw 150.

The frame 110 is a case that houses a stator iron core 161, which will be described in FIG. 3 described below. The output side flange 120 is a member that covers an end portion of a motor output side in the frame 110. The output side flange 120 includes a cylinder portion (a tubular portion) 121 and a collar portion 122. The cylinder portion 121 houses one end of the frame 110. The collar portion 122 is formed in a surface perpendicular (or approximately perpendicular) to a direction to which a central axis of the cylinder portion 121 extends. The collar portion 122 includes holes (for example, screw holes 124 described later) penetrating the collar portion 122. The opposite output side bracket 130 is a member covering the other end of the frame 110. That is, the opposite output side bracket 130 is installed on the other end of the frame 110. The rotation detector 140 includes, for example, a rotation position detecting element, such as an encoder. The rotation detector 140 is disposed (installed) in an end portion of the opposite output side bracket 130. The end portion is on a side that is not in contact with the frame 110. The rotation detector 140 detects a rotation position of the motor 100. The rotation detector 140 may be configured to output a detection result of the rotation position of the motor 100 to, for example, an external device of the motor 100. The mounting screw (the mounting member) 150 is a member for fixing the output side flange 120 to, for example, the opposite output side bracket 130 by being fitted to a screw hole disposed in the collar portion 122.

Figure 2:
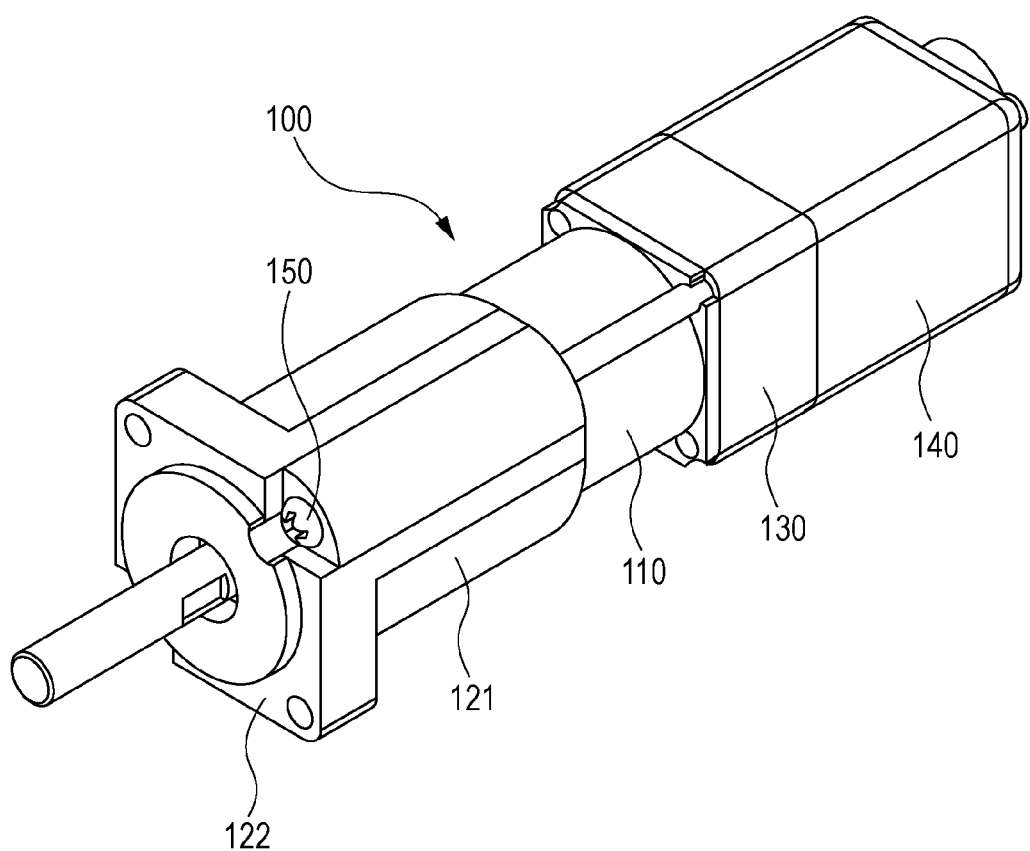
FIG. 2 is a perspective view of the motor according to the first embodiment, and the components of the motor are assembled in this drawing.

FIG. 2 is a perspective view illustrating the motor 100. In FIG. 2, the components of the motor 100 are assembled. The frame 110 has a cylindrical shape. The frame 110 is configured to fit to the cylinder portion 121. Fitting the frame 110 to the cylinder portion 121 causes the cylinder portion 121 to house the frame 110 such that the cylinder portion 121 covers at least a part of an outer wall of the frame 110.

Figure 3:
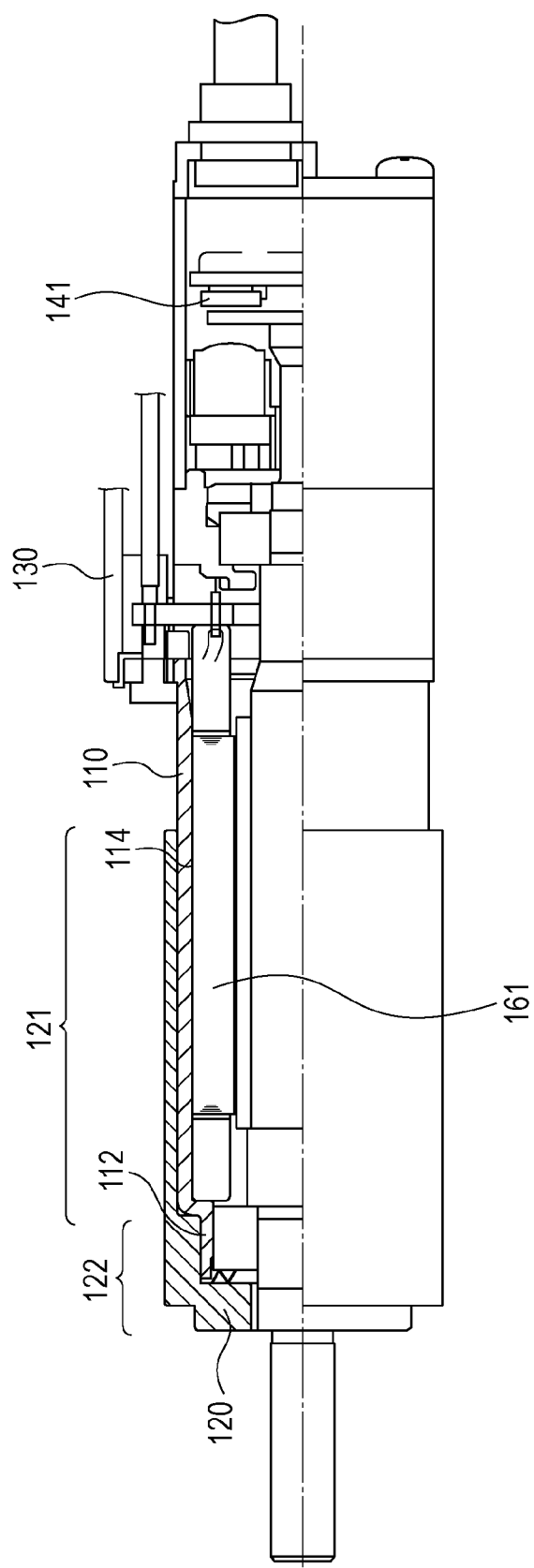
FIG. 3 is a cross-sectional side view of the motor.

FIG. 3 is a cross-sectional side view of the motor 100. In FIG. 3, representation of the components is partially omitted to clearly show the structure of the components. The frame 110 internally includes the stator iron core 161 of the motor 100. The frame 110 includes a fitted portion 112, which is a portion fitted to the output side flange 120, in a distal end portion (a left end in FIG. 3) of the frame 110. Furthermore, the frame 110 includes a stator housing 114, which is a portion housing the stator iron core 161. That is, the frame 110 includes the stator housing 114, which houses the stator iron core 161, and the fitted portion 112, which is fitted to the output side flange 120, along an extending direction of a rotation shaft of the motor 100. Heat generated from the stator iron core 161 and the coil inside the stator iron core 161 is transmitted toward the output side flange 120 (the collar portion 122) via a heat transfer route from the frame 110 to the cylinder portion 121. The fitted portion 112 is, for example, a portion that is narrowed at the left end of the frame 110. The stator housing 114 includes, for example, an inner surface of the frame 110 that covers the stator iron core 161.

The cylinder portion 121 houses the frame 110 (one end of the frame 110) in a tubular hollow of the cylinder portion 121. The large part of the frame 110 is covered with the cylinder portion 121. In a state illustrated in FIG. 3, the cylinder portion 121 covers at least a half of area of the stator housing 114 of the frame 110, the area housing the stator iron core 161. Accordingly, a half or more portion along an axial direction (a longitudinal direction) of the stator iron core 161 is covered with the cylinder portion 121. That is, a half or more portion of the stator iron core 161 is covered with the cylinder portion 121 along the axial direction (the longitudinal direction) of the stator iron core 161. This effectively forms the heat transfer route. As a result, the heat dissipation performance can be enhanced.

The further portion of the stator iron core 161 may be covered with the cylinder portion 121. For example, the cylinder portion 121 may cover all the area of the stator housing 114 of the frame 110, the area housing the stator iron core 161. That is, the stator iron core 161 may be covered with the cylinder portion 121 over an entire length of the stator iron core 161. That is, the whole stator iron core 161 may be covered with the cylinder portion 121 along the axial direction (the longitudinal direction) of the stator iron core 161. This effectively forms the heat transfer route. As a result, the heat dissipation performance can be enhanced.

The rotation detector 140 internally houses a detecting element 141. The cylinder portion 121 is disposed to avoid being in direct contact with the opposite output side bracket 130. That is, the cylinder portion 121 and the opposite output side bracket 130 are each installed on the frame 110 to avoid being in direct contact with one another. In view of this, it is considered that an amount of the heat transmitted from the cylinder portion 121 further to the opposite output side bracket 130 is little even when the heat generated from the stator iron core 161 is transmitted toward the cylinder portion 121. Accordingly, in this embodiment, especially a component that is susceptible to heat, such as the detecting element 141, is disposed on a side of the opposite output side bracket 130. In view of this, a failure of the rotation detector 140 (the detecting element 141) caused by heat can be reduced.

FIG. 4 is a cross-sectional side view of the motor 100. FIG. 4 illustrates an enlarged vicinity of the cylinder portion 121 illustrated in FIG. 3. A hollow may be disposed between the cylinder portion 121 and the frame 110 in the case where a fitting strength of the frame 110 and the output side flange 120 is sufficiently high. Alternatively, a space between the cylinder portion 121 and the frame 110 may be filled with an adhesive 123 to strongly adhere the frame 110 and the output side flange 120. In the case where the adhesive 123 is filled between the cylinder portion 121 and the frame 110, it is preferred to use an adhesive with good thermal conductivity as a material of the adhesive 123. A candidate adhesive includes, for example, an adhesive using a high thermal conductivity resin. However, the adhesive is not limited to this.

First Embodiment: Conclusion

In the motor 100 according to the first embodiment, the output side flange 120 includes the cylinder portion 121. The cylinder portion 121 covers at least a half or more of the portion of the frame 110 that houses the stator iron core 161. This effectively transmits the heat generated from the stator iron core 161 via the output side flange 120. In an actual evaluation, a continuous rated output of the motor could be enhanced from a conventional output of 20 W to 28 W.

Second Embodiment

Figure 5A:
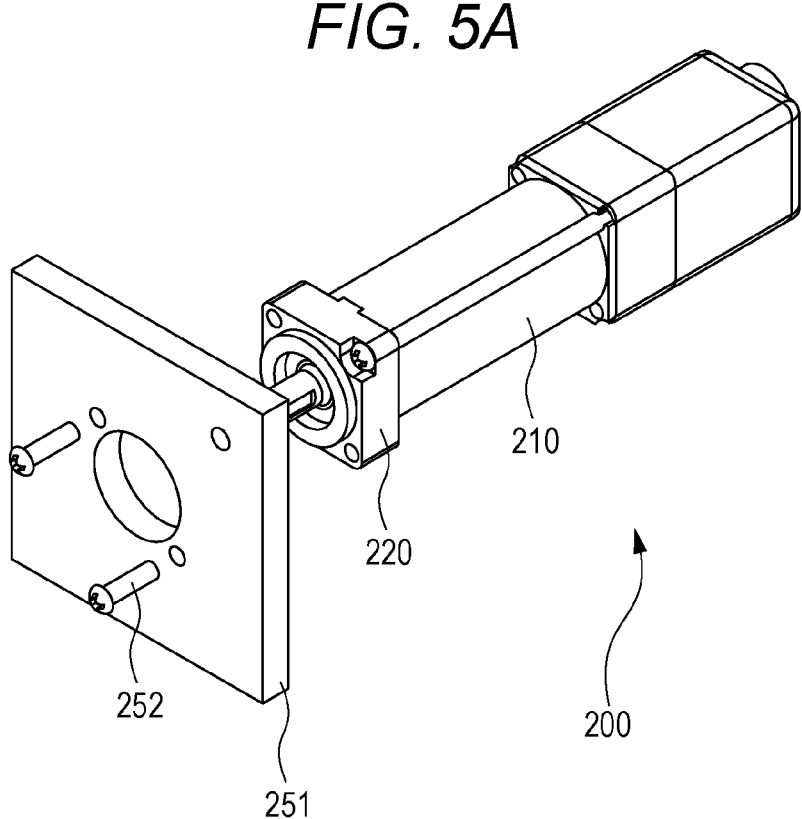
FIGS. 5A and 5B are perspective views of a conventional motor.
Figure 5B:
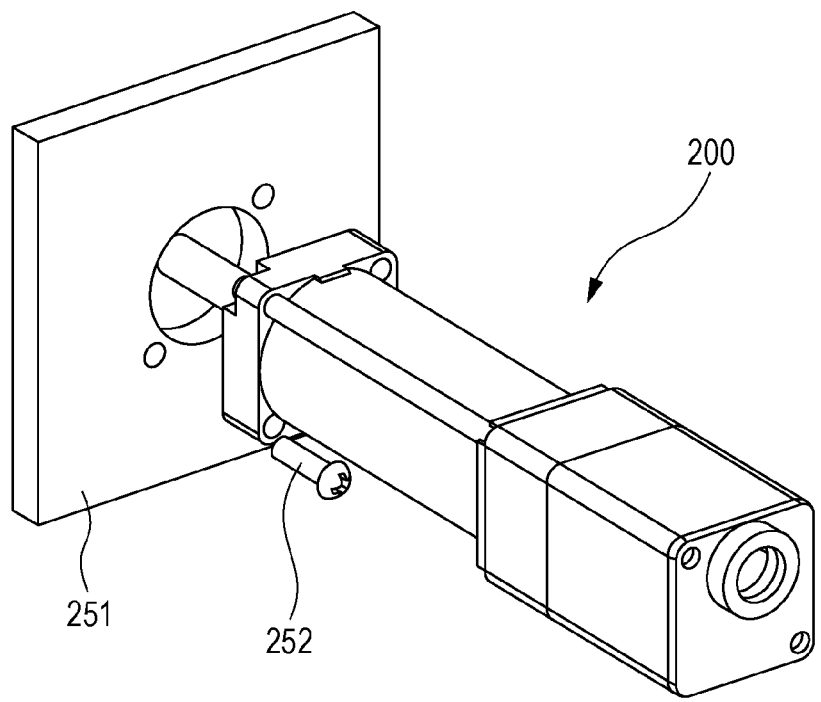

FIGS. 5A and 5B are perspective views of a conventional motor 200. The motor 200 includes a frame 210 and an output side flange 220. Unlike the motor 100 according to the first embodiment, the output side flange 220 does not include the cylinder.

In order to install the motor 200 onto a mounting plate 251, the following method is considered. That is, the mounting plate 251 includes a hole through which a motor shaft penetrates and screw holes as illustrated in FIG. 5A. Via these screw holes of the mounting plate 251, mounting screws 252 are inserted into an end portion (screw holes) of the output side flange 220. This fixes the output side flange 220 to the mounting plate 251. However, this installation method requires a work space in a space (a space in an opposite side of the motor 200 in the mounting plate 251) in an opposite side of the motor 200 viewing from the mounting plate 251. In view of this, the installation operation is difficult to be performed especially in the case where the work area is narrow.

As illustrated in FIG. 5B, inserting the mounting screw 252 from a side identical to the side (the side at which the motor 200 exists in the mounting plate 251) of the motor 200 viewing from the mounting plate 251 may be considered. However, according to this method, a head of the mounting screw 252 has a possibility to contact the frame 210 especially in the case where the motor 200 is relatively small in size. Accordingly, there is a possibility that the mounting screw 252 is incapable of being vertically inserted into the screw hole. This is because a head diameter of a screw is generally greater than a shaft diameter of the screw. Accordingly, a realistic method for installing the motor 200 is the method illustrated in FIG. 5A. This becomes a cause that inhibits a space saving of peripheral equipment including the motor 200.

Figure 6A:
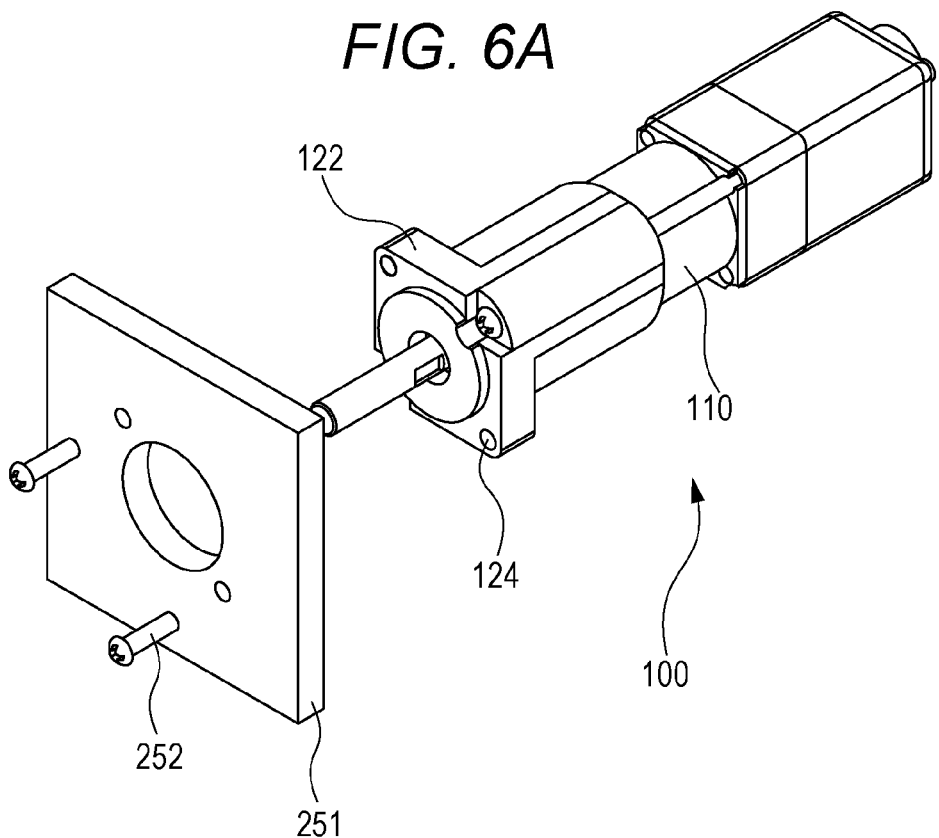
FIGS. 6A and 6B are perspective views of a motor according to a second embodiment.
Figure 6B:
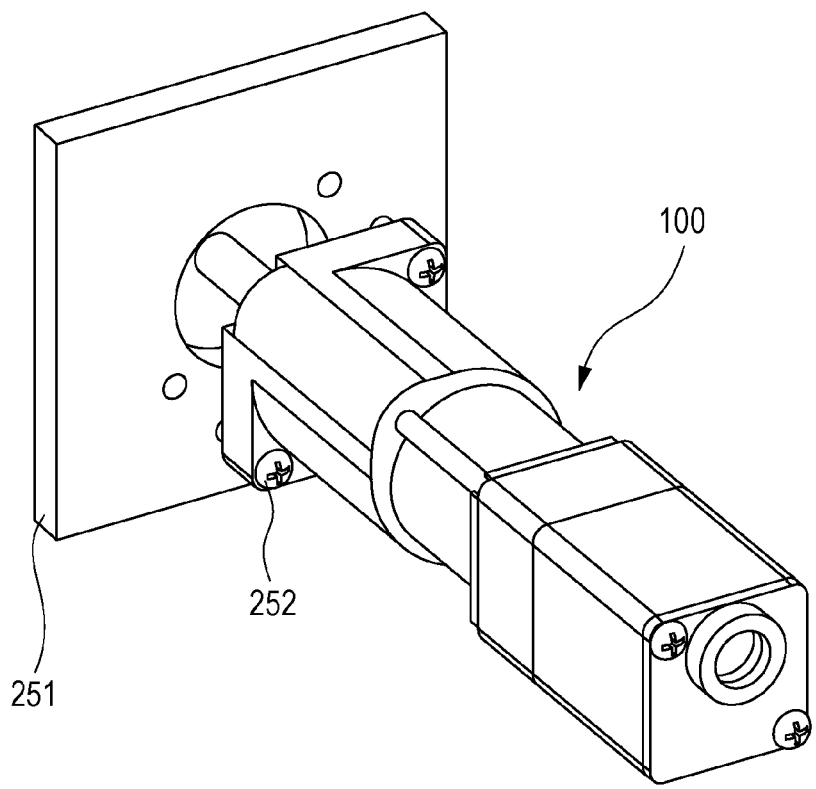

FIGS. 6A and 6B are perspective views of the motor 100 according to the second embodiment of the present disclosure. The motor 100 according to the second embodiment has a configuration roughly similar to the motor 100 according to the first embodiment. The motor 100 according to the second embodiment includes a configuration described below relating to an installation of the output side flange 120 to the mounting plate 251 using the mounting screws 252.

FIG. 6A is a drawing illustrating a state where the motor 100 is installed on the mounting plate 251 from an end portion side (a side of the mounting plate 251 of the collar portion 122) of the output side flange 120. The collar portion 122 includes the screw holes 124 for inserting the mounting screws 252. A surface (an inner surface) of the screw hole 124 is formed with a thread groove. For example, the two screw holes 124 can be diagonally disposed on a surface of the collar portion 122. The number and the position of the screw holes 124 are not limited to this. Sandwiching the mounting plate 251 with the collar portion 122 and the mounting screws 252 and fitting the mounting screws 252 to the screw holes 124 ensures installation of the motor 100 on the mounting plate 251 from an opposite side of the opposite output side bracket 130. That is, inserting and fitting the mounting screws 252 into the screw holes 124 via the mounting plate 251 from an opposite side (the mounting plate 251 side of the collar portion 122) from a side where the motor 100 exists in the mounting plate 251 ensures installation of the motor 100 (the collar portion 122) on the mounting plate 251.

FIG. 6B is a drawing illustrating a state where the motor 100 is installed on the mounting plate 251 from the opposite output side bracket 130 side (the opposite output side bracket 130 side of the collar portion 122). A plane size of the collar portion 122 is formed to be larger than a plane size of the cylinder portion 121. The screw hole 124 is disposed at a position sufficiently apart from a side surface of the cylinder portion 121 such that the head of the mounting screw 252 does not contact the cylinder portion 121 when the mounting screw 252 is inserted into the screw hole 124. That is, the screw hole 124 is formed at a position where the mounting screw 252 does not contact the cylinder portion 121 when the mounting screw 252 is inserted into the screw hole 124. Therefore, unlike the method illustrated in FIG. 5B, the motor 100 can be installed on the mounting plate 251 from the opposite output side bracket 130 side. That is, inserting and fitting the mounting screw 252 from the opposite output side bracket 130 side of the collar portion 122 via the screw hole 124 to the screw hole of the mounting plate 251 ensures installation of the motor 100 (the collar portion 122) on the mounting plate 251. In this case, an inner surface of the screw hole of the mounting plate 251 may be formed with the thread groove. The inner surface of the screw hole 124 may be formed without the thread groove.

Modification of this Disclosure

The aspect of the present disclosure is not limited to the above-described embodiments, but includes various modifications. For example, the above-described embodiments are described in detail in order to explain the aspect of the present disclosure easily. The embodiments described above are not necessarily limited to include every member (configuration) described. It is possible to replace a part of a configuration of a certain embodiment with a configuration of another embodiment. It is also possible to add a configuration of another embodiment to a certain embodiment. Adding another configuration to a part of a configuration of each of the embodiments, removing a part of a configuration of each of the embodiments, and replacing a part of a configuration of each of the embodiments with another configuration are possible.

In the above-described embodiments, the output side flange 120 includes the cylinder portion 121 as a structure to house the frame 110. A portion that houses the frame 110 may not necessarily be a cylinder, and any tubular shape may be employed. The portion that houses the frame 110 may, for example, be a tubular shape in a quadrangular prism-shape. The same applies to a shape of the frame 110. That is, the shape of the frame 110 may not be a cylinder, and any tubular shape may be employed. An outside shape of the frame 110 may be a shape (a similarity shape) similar to an inside shape of the portion that houses the frame 110 of the output side flange 120.

The above-described embodiments have described that filling the adhesive 123 between the frame 110 and the output side flange 120 is allowed. Depending on a specific product specification, a filler other than an adhesive can be filled between the frame 110 and the output side flange 120. For example, high thermal conductivity grease is considered to be filled between the frame 110 and the output side flange 120. Thus, the motor 100 may include the filler filled between the cylinder portion 121 and the frame 110. Alternatively, the filler, such as the adhesive, may be filled between a portion other than the cylinder portion 121 in the output side flange 120 and the frame 110.

In the above-described embodiment, the motor 100 is installed on the mounting plate 251 by inserting the mounting screw 252 into the mounting plate 251. However, the motor 100 can be installed on the mounting plate 251 using a mounting member other than the mounting screw 252. For example, the motor 100 can be installed on the mounting plate 251 using a rod-shaped mounting member. In this case, a through hole for inserting the rod-shaped mounting member may be disposed in the mounting plate 251. In any cases, it is preferred to dispose the hole (the screw hole or the through hole) at a position (for example, a position in the collar portion 122) where a head (the thickest portion) of the mounting member does not contact the cylinder portion 121. That is, the hole of the collar portion 122 is preferred to be formed at a position where the mounting member does not contact the cylinder portion 121 when the mounting member is inserted into this hole.

Figure 7:
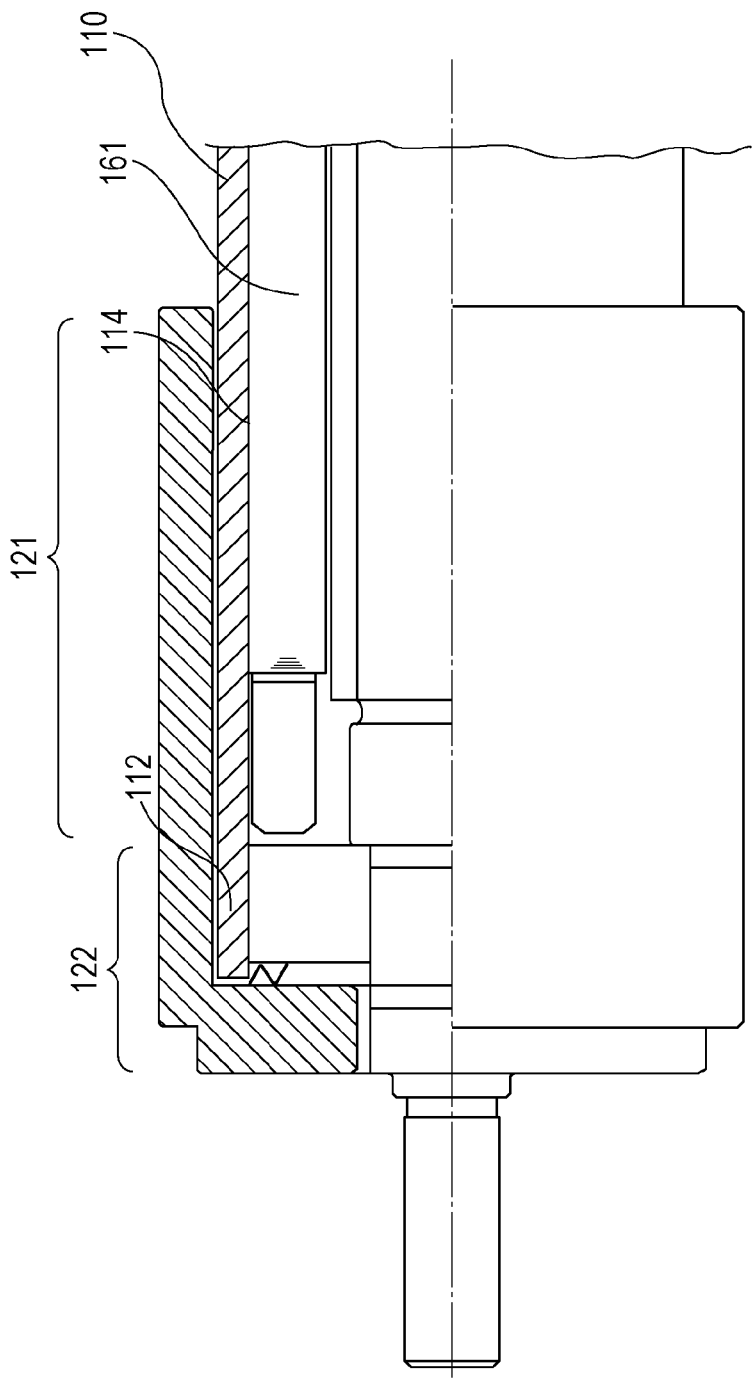
FIG. 7 is a cross-sectional side view of a motor according to a modification.

The frame 110 does not have to include the left end portion (see FIG. 4 and the like) that is narrower than other portions. For example, as illustrated in FIG. 7, the frame 110 may be configured such that the left end portion of the frame 110 has an outer diameter similar to the other portions of the frame 110. In this case, the fitted portion 112 of the frame 110 is also the left end portion (a portion within a predetermined area from the left end) of the frame 110.

In the motor according to one aspect of the present disclosure, a motor frame has a portion that houses a stator iron core, and the output side flange may cover at least a half or more of this portion in its longitudinal direction. In the first embodiment, a half or more of a length along an axial direction of the stator iron core 161 may be covered with the cylinder portion 121.

The motor according to this embodiment may be the following first to seventh motors.

A first motor is a motor including a stator iron core. The motor includes a frame that houses the stator iron core and a flange that includes a tubular portion formed in a tubular shape. An outer periphery of the frame includes a stator housing that houses the stator iron core and a fitted portion that fits to the flange along a direction to which a rotation shaft of the motor extends. The tubular portion covers at least a half of a portion where the stator housing houses the stator iron core.

A second motor according to the first motor is configured as follows. The tubular portion covers all of an area where the stator housing houses the stator iron core.

A third motor according to the first motor is configured as follows. The tubular portion houses one end of the frame. The motor further includes a bracket installed on the other end of the frame. The tubular portion and the bracket are each installed on the frame to avoid being in direct contact with one another.

A fourth motor according to the third motor is configured as follows. The motor further includes a rotation detector that detects a rotation position of the motor. The rotation detector is installed on an end portion of the bracket, and this end portion of the bracket is on a side that does not contact the frame.

A fifth motor according to the first motor is configured as follows. The motor further includes a filler filled in a position where the frame fits to the tubular portion.

A sixth motor according to the first motor is configured as follows. The flange includes a collar portion formed in a surface perpendicular to a central axis direction of the tubular portion. The collar portion includes a hole that penetrates the collar portion. The hole is formed at a position where a mounting member does not contact the tubular portion when the mounting member is inserted into the hole.

A seventh motor is a motor including a stator iron core. The motor includes a frame housing the stator iron core and a flange including a tubular portion formed in a tubular shape. An outer periphery of the frame includes a stator housing that houses the stator iron core and a fitted portion that fits to the flange along a direction to which a rotation shaft of the motor extends. The tubular portion covers at least a half of a portion where the stator housing houses the stator iron core. The tubular portion houses one end of the frame. The motor further includes a bracket installed on the other end of the frame. The tubular portion and the bracket are each installed on the frame to avoid being in direct contact with one another.

The foregoing detailed description has been presented for the purposes of illustration and description. Many modifications and variations are possible in light of the above teaching. It is not intended to be exhaustive or to limit the subject matter described herein to the precise form disclosed. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims appended hereto.

What is claimed is:
1. A motor comprising:
a stator iron core;
a frame that houses the stator iron core; and
a flange including a tubular portion formed in a tubular shape, wherein
the frame includes, along an extending direction of a rotation shaft of the motor, a stator housing that houses the stator iron core and a fitted portion that is fitted to the flange, and
the tubular portion covers at least a half of an area of the stator housing, and the area of the stator housing overlaps the stator iron core from an outside of the stator iron core in a direction orthogonal to the extending direction of the rotation shaft.
2. The motor according to claim 1, wherein
the tubular portion covers all the area of the stator housing.
3. The motor according to claim 1, wherein
the tubular portion houses one end of the frame,
the motor further includes a bracket installed on another end of the frame, and
the tubular portion and the bracket are each installed on the frame to avoid being in direct contact with one another.
4. The motor according to claim 3, further comprising
a rotation detector that detects a rotation position of the motor, wherein
the rotation detector is installed on an end portion of the bracket, the end portion of the bracket being on a side that does not contact the frame.
5. The motor according to claim 3, wherein the flange is not in direct contact with the bracket.
6. The motor according to claim 1, further comprising
a filler filled between the tubular portion and the frame.
7. The motor according to claim 1, wherein
the flange includes a collar portion formed in a surface perpendicular to a direction to which a central axis of the tubular portion extends,
the collar portion includes a hole that penetrates the collar portion, and
the hole is formed at a position where a mounting member does not contact the tubular portion when the mounting member is inserted into the hole.
8. The motor according to claim 1, wherein the tubular portion, the stator housing and the stator iron core are disposed in this order from an outside of the motor to an inside of the motor in the direction orthogonal to the extending direction of the rotation shaft.
9. The motor according to claim 1, wherein the tubular portion, the stator housing and the stator iron core are coaxially disposed about the rotation shaft in this order from an outside of the motor to an inside of the motor in the direction orthogonal to the extending direction of the rotation shaft.
10. The motor according to claim 1, wherein the flange covers an end of the motor at a motor output side in the extending direction of the rotation shaft.
11. The motor according to claim 1, wherein the flange, the fitted portion and the stator housing are disposed in this order from a motor output side in the extending direction of the rotation shaft.
12. The motor according to claim 1, wherein the flange, the fitted portion that is fitted to the flange and the stator housing, an inner surface of which covers the stator iron core, are disposed in this order from a motor output side in the extending direction of the rotation shaft.

* * * * *